US012798294B2

(12) United States Patent
Palazzolo et al.

(10) Patent No.: US 12,798,294 B2
(45) Date of Patent: Nov. 17, 2026

(54) AXLE ASSEMBLY WITH DISCONNECT SYSTEM

(71) Applicant: Dana Automotive Systems Group, LLC, Maumee, OH (US)

(72) Inventors: Joseph Palazzolo, Novi, MI (US); Raunak Bindra, Novi, MI (US); Brandon Pound, Toledo, OH (US); Thomas Mcginn, Novi, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 345 days.

(21) Appl. No.: 18/422,361

(22) Filed: Jan. 25, 2024

(65) Prior Publication Data

US 2024/0246360 A1 Jul. 25, 2024

Related U.S. Application Data

(60) Provisional application No. 63/481,580, filed on Jan. 25, 2023.

(51) Int. Cl.

| | |
|---|---|
| ***B60B 35/14*** | (2006.01) |
| ***B60B 35/00*** | (2006.01) |
| ***B60B 35/18*** | (2006.01) |
| ***B60K 17/02*** | (2006.01) |

(52) U.S. Cl.

CPC ............ *B60B 35/14* (2013.01); *B60B 35/003* (2013.01); *B60B 35/18* (2013.01); *B60K 17/02* (2013.01); *B60B 2380/12* (2013.01)

(58) Field of Classification Search

CPC ....... B60B 35/003; B60B 35/12; B60B 35/14; B60B 35/18; B60B 2380/12; B60B 27/00; B60B 27/04; B60B 27/047; B60B 27/065; B60B 27/06; B60B 27/02; B60B 27/26; B60B 27/001; B60B 27/005; B60B 27/0015; B60B 27/021; F16D 11/14; F16D 11/11; F16D 11/04

USPC .......................................................... 301/131

See application file for complete search history.

(56) References Cited

U.S. PATENT DOCUMENTS

| | | | | |
|---|---|---|---|---|
| 2,509,081 A * | 5/1950 | Bluth | F16B 21/18 403/375 |
| 5,018,597 A * | 5/1991 | Wakabayashi | F16D 11/14 403/1 |
| 5,148,901 A * | 9/1992 | Kurihara | F16D 25/061 192/30 W |
| 5,394,967 A * | 3/1995 | Bigley | F16D 11/14 192/93 R |

(Continued)

FOREIGN PATENT DOCUMENTS

| | | | |
|---|---|---|---|
| DE | 10008182 B4 * | 3/2004 | F16D 1/108 |
| EP | 0553516 A1 * | 8/1993 | B60K 17/32 |

*Primary Examiner* — S. Joseph Morano
*Assistant Examiner* — Eva L Comino
(74) *Attorney, Agent, or Firm* — McCoy Russell LLP

(57) ABSTRACT

A wheel hub system. The wheel hub system includes, in one example, includes an outer bearing assembly with an inner race coupled to a hub body, a wheel flange configured to removably coupled to the hub body, and an inner bearing including an outer race that is coupled to the hub body and an inner race that is coupled to a shaft. In the wheel hub system, the hub body includes interior splines which circumferentially surround exterior splines on the shaft.

15 Claims, 6 Drawing Sheets

(56) References Cited

U.S. PATENT DOCUMENTS

| | | | | | |
|---|---|---|---|---|---|
| 5,520,272 | A * | 5/1996 | Ewer | F16D 43/02 | 192/69.43 |
| 5,529,158 | A * | 6/1996 | Itoh | B60K 17/3515 | 192/45.01 |
| 5,562,192 | A * | 10/1996 | Dick | B60K 17/344 | 192/84.1 |
| 5,597,058 | A * | 1/1997 | Ewer | F16D 43/02 | 192/54.5 |
| 5,908,080 | A * | 6/1999 | Bigley | B60K 17/3515 | 180/247 |
| 5,967,279 | A * | 10/1999 | Itoh | B60K 23/08 | 192/85.11 |
| 8,747,014 | B2 * | 6/2014 | Raszkowski | F16H 57/0031 | 403/372 |
| 9,162,656 | B2 * | 10/2015 | Mattson | B60T 8/1769 | |
| 10,801,556 | B2 * | 10/2020 | Eschenburg | B60K 17/02 | |
| 2018/0022154 | A1 * | 1/2018 | Coletta | B60B 27/04 | 301/126 |

* cited by examiner

AXLE ASSEMBLY WITH DISCONNECT SYSTEM

CROSS REFERENCE TO RELATED APPLICATION

The present application claims priority to U.S. Provisional Patent Application No. 63/481,580, entitled "AXLE ASSEMBLY WITH DISCONNECT SYSTEM", and filed on Jan. 25, 2023. The entire contents of the above-listed application are hereby incorporated by reference for all purposes.

TECHNICAL FIELD

The present disclosure relates to an axle assembly with a wheel hub system that is configured to attach to a torque coupling and a wheel end disconnect device, in different configurations.

BACKGROUND AND SUMMARY

Vehicle drivetrains utilize drive axles to deliver mechanical power to drive wheels. Certain manufacturers have produced aftermarket torque interruption devices available to end-users for drive axle modification. Other drive axles have been designed with torque interruption capabilities by the axle manufacturer.

The inventors have recognized several issues with the abovementioned drive axles. For instance, previous aftermarket torque interruption devices have demanded complex and laborious installation procedures and may be costly to manufacture, in some cases. Further, previous drive axles with torque interruption capabilities may not be desired by many end-users. Additionally, certain previous torque interruption devices may be complex and difficult to access for servicing, repair, and replacement. Drive axles in electric vehicles (EVs) without torque interruption capabilities experience back electromotive force (EMF) during towing. The back EMF has the potential to degrade some motor components. More generally, the inventors have recognized that greater adaptability with regard to wheel end construction is desirable in vehicle powertrains. To prevent back EMF generation, the EV may be placed on a flatbed trailer during towing. However, this type of towing may be costly and impractical for certain types of vehicles such as larger vehicles, for example.

The inventors have recognized the abovementioned issues and developed a wheel hub system to at least partially overcome these issues. In one example, the wheel hub system includes an outer bearing assembly with an inner race coupled to a hub body. The wheel hub system further includes a wheel flange configured to removably coupled to the hub body. The wheel hub system even further includes an inner bearing with an outer race that is coupled to the hub body and an inner race that is coupled to a shaft. In the wheel hub system, the hub body includes interior splines which circumferentially surround exterior splines on the shaft. In this way, the system's adaptability is increased by allowing couplings and other devices to be quickly and efficiently attached to the wheel hub system via the splined interfaces. For instance, in one example, the interior splines are configured to removably couple to a hub lock device configured to inhibit mechanical power transfer therethrough when unlocked, in a first configuration. In a second configuration, the interior splines are configured to removably couple to a torque coupling. In this way, both the torque coupling and the hub lock device are able to be effectively coupled to the wheel hub system. Consequently, a drive axle in which the wheel hub system is incorporated is able to be adapted for use in a wider range of vehicle platforms and by the end-user to achieve hub locking functionality. Customer appeal is increased as a result.

Further, in one example, the hub body includes a fastener joint that is configured to receive multiple fasteners that extend through the hub lock device in the first configuration, and through the torque coupling in the second configuration. In this way, the connection between the torque coupling and the hub lock device is further strengthened with a joint that is easily accessible by manufacturing personnel, mechanics, end-users, and the like.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A wheel hub system in an axle assembly is described herein which achieves increased adaptability by enabling the wheel hub system to be quickly and efficiently adapted for both continuous torque lock and wheel end disconnect capabilities. To achieve this functionality, the wheel hub system includes a hub body with a female spline that surrounds male splines on a shaft. A gap formed between the female splines and the male splines allows the system to be effectively coupled to torque couplings and hub locker devices, in different configurations. The wheel hub system may further include a fastener joint that allows fasteners to securely and removably attach the torque couplings and the hub locker devices to the hub body. The fastener joint may be positioned at an outboard side of the system, allowing for simplified tooling when installing and removing the torque couplings and the hub locker devices.

Figure 1:
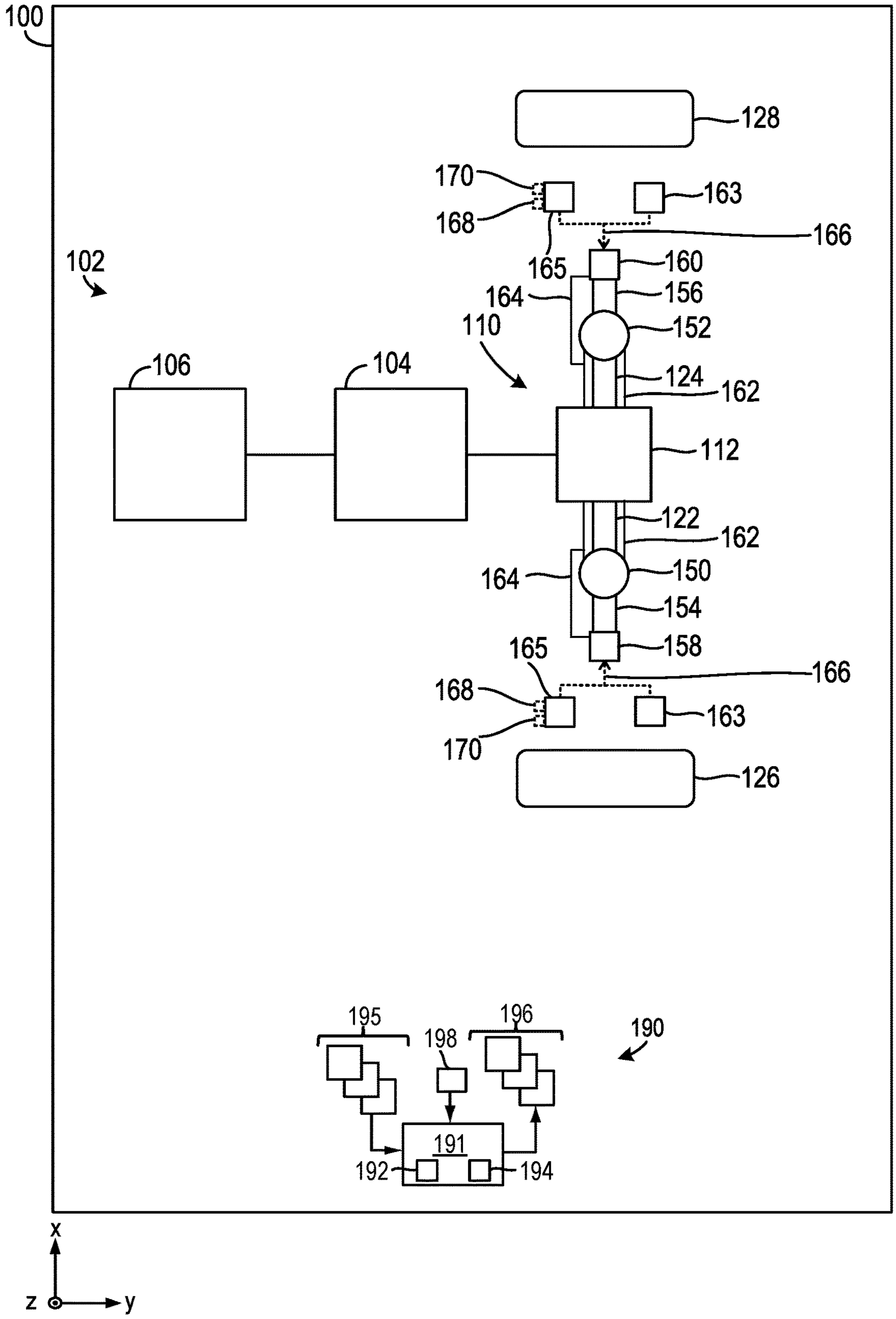
FIG. 1 is an illustration of a vehicle with a powertrain that includes a drive axle with wheel hub systems.

FIG. 1 shows a schematic illustration of a vehicle 100. The vehicle 100 may be a passenger vehicle, a commercial vehicle, an on-highway vehicle, or an off-highway vehicle, in different examples.

The vehicle 100 includes a powertrain 102 with a prime mover 106 (e.g., an internal combustion engine and/or an electric motor) and a transmission 104 (e.g., gearbox), in some instances. Specifically, in one example, the vehicle may be an electric vehicle (EV) such as an all-electric vehicle or a hybrid electric vehicle (HEV). In either EV example, the powertrain 102 includes an electric drive unit with a traction motor. To elaborate, the electric drive unit may be an electric axle, in one specific example, which is expanded upon herein.

In the illustrated example, the prime mover 106 delivers mechanical power to the transmission 104 during powertrain operation. In the EV example, power may flow from the transmission to the electric motor while the motor is operated as a generator during regeneration operation. In other examples, the prime mover 106 may deliver power directly to one or more drive axles.

Further, in the illustrated example, the transmission 104 is mechanically coupled to a drive axle assembly 110. In the illustrated example, the drive axle assembly 110 may include a differential 112, shafts 122 and 124 (e.g., intermediate shafts), joints 150 and 152 (e.g., constant velocity (CV) joints), shafts 154 and 156 (e.g., stub shafts), wheel hub systems 158 and 160, and/or drive wheels 126 and 128. Specifically, the differential 112 is rotationally coupled to the shafts 122 and 124. The shafts 122 and 124 are rotationally coupled to the joints 150 and 152, in the illustrated example. Further, in the illustrated example, the joints 150 and 152 are rotationally coupled to the shafts 154 and 156 which are rotationally coupled to the wheel hub systems 158 and 160. However, in other examples, the shafts 122 and 124 may be directly coupled to the wheel hub systems 158 and 160. It will be understood that the drive wheels 126 and 128 may be removably coupled to the wheel hub systems 158 and 160 when the vehicle axle is assembled.

The shafts 122 and 124 may be housed via an axle tube assembly 162. A steering system 164 which may include a steering knuckle, yoke, steering cylinder, and the like may be coupled to the axle tube assembly 162 and the wheel hub systems 158 and 160.

The wheel hub systems 158 and 160 may be coupled to the drive wheels 126 and 128, respectively using multiple types of coupling devices. These devices are discussed in greater detail herein. Using multiple wheel end coupling devices allows the drivetrain's modularity to be increased, thereby enabling the vehicle's applicability to be expanded to a wider variety of vehicle platforms.

The transmission 104 may include gears, shafts, and the like which may function to alter the speed of the mechanical input from the prime mover for speed changes at the transmission output. The transmission 104 may be a multi-speed transmission which includes clutches, a continuously variable transmission, or a single speed transmission in different examples. However, as discussed above, the transmission may be omitted from the drivetrain, in other examples.

The differential 112 may be an open differential, a locking differential, a limited slip differential, and the like. In the example illustrated in FIG. 1, the prime mover 106, the transmission 104, and the drive axle assembly 110 are spaced away from one another. However, it will be appreciated that one or more of these components may be collocated in an axle assembly in other examples. For instance, when the vehicle is an EV, the electric motor, the transmission (e.g., the gearbox), and the axle assembly may form an electric axle, in a use-case example. In such an example, components in the electric drive unit such as the traction motor, the gearbox, and in some cases the inverter are packaged into the axle assembly.

Figure 2:
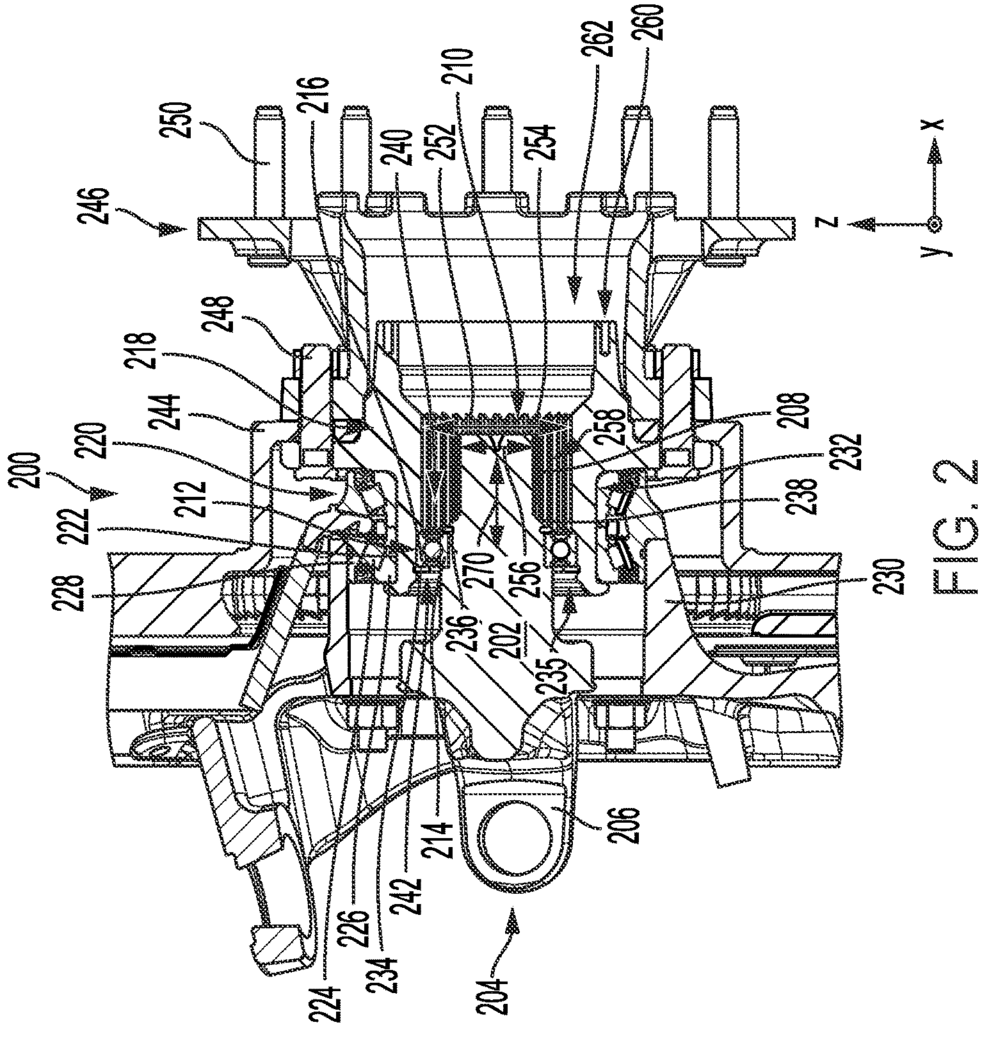
FIG. 2 is a detailed cross-sectional illustration of an example of a wheel hub system.
Figure 5:
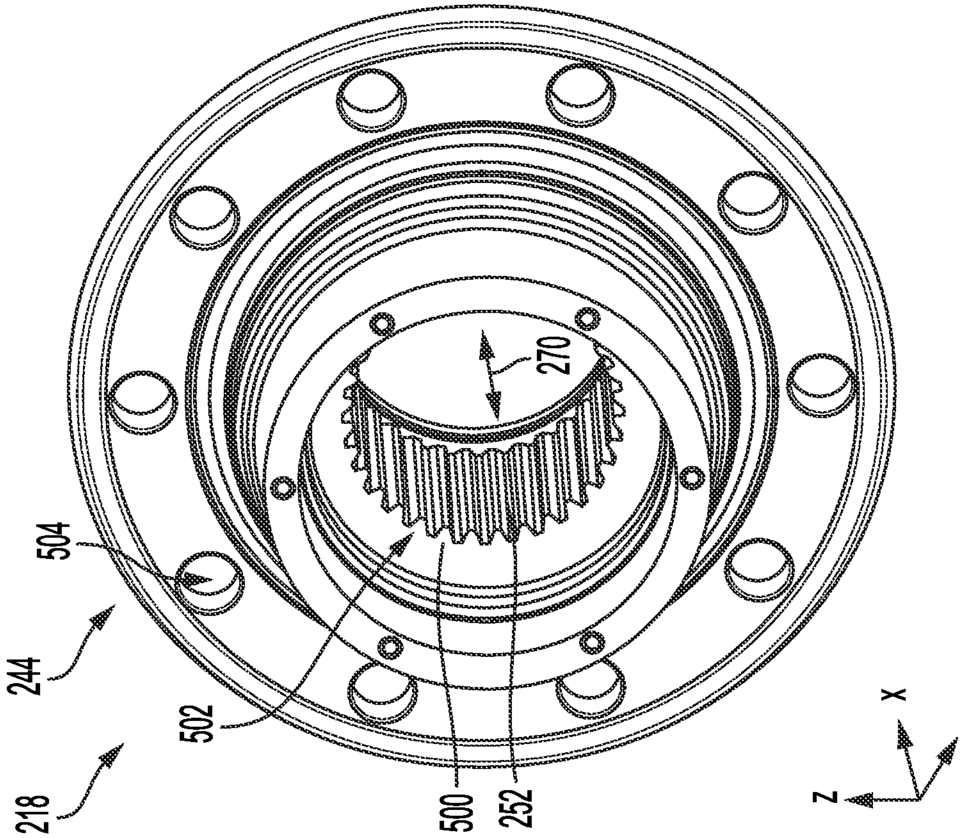
FIG. 5 is a detailed illustration of a hub body, in the wheel hub system, depicted in FIG. 2.
Figure 4:
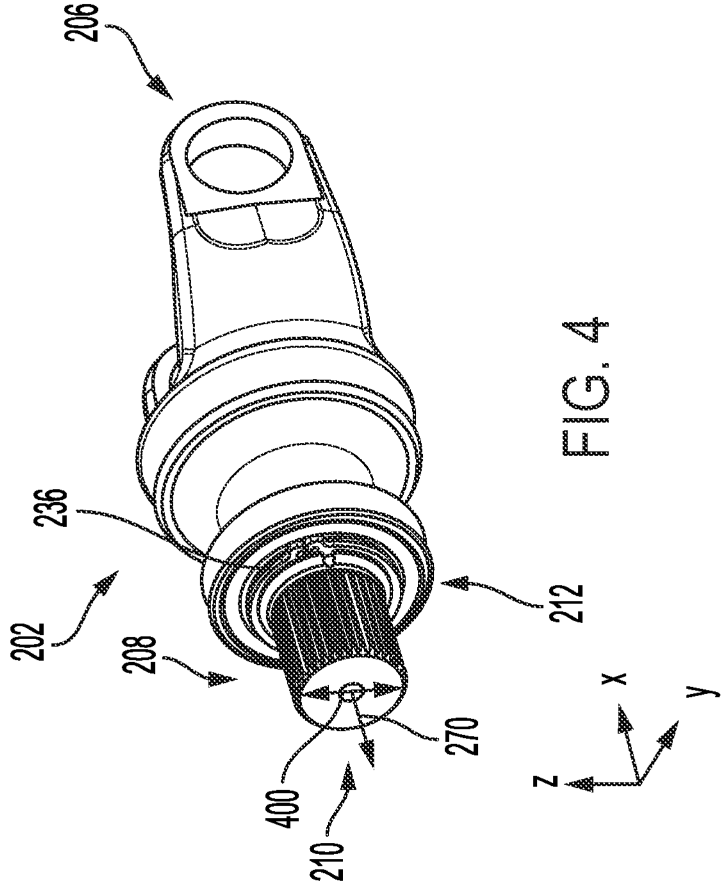
FIG. 4 is a detailed illustration of a shaft with a splined section and an inner bearing assembly, depicted in FIG. 2.
Figure 6:
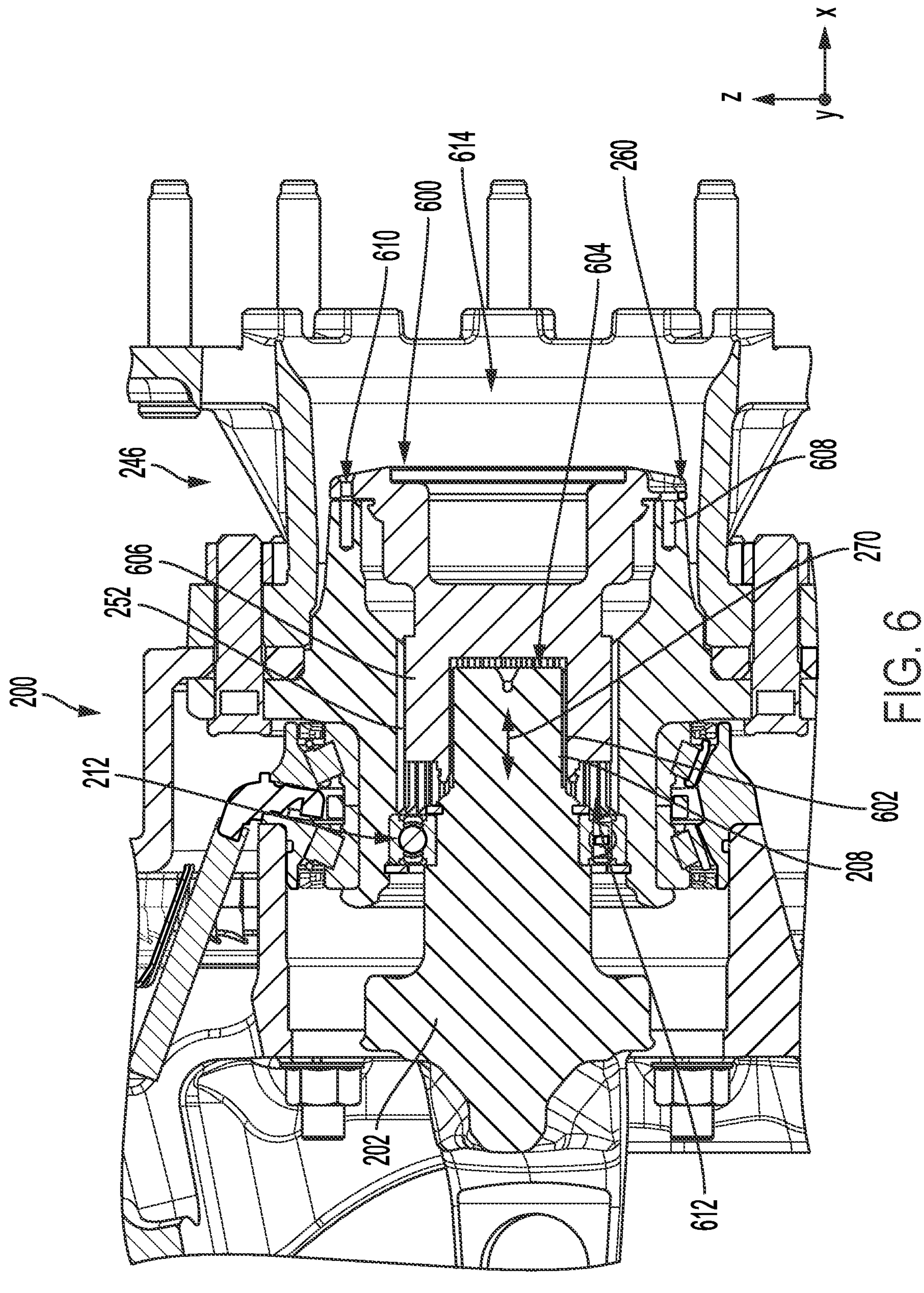
FIG. 6 is a detailed cross-sectional illustration of the wheel hub system, depicted in FIG. 2, with a torque coupling attached to the system.
Figure 8:
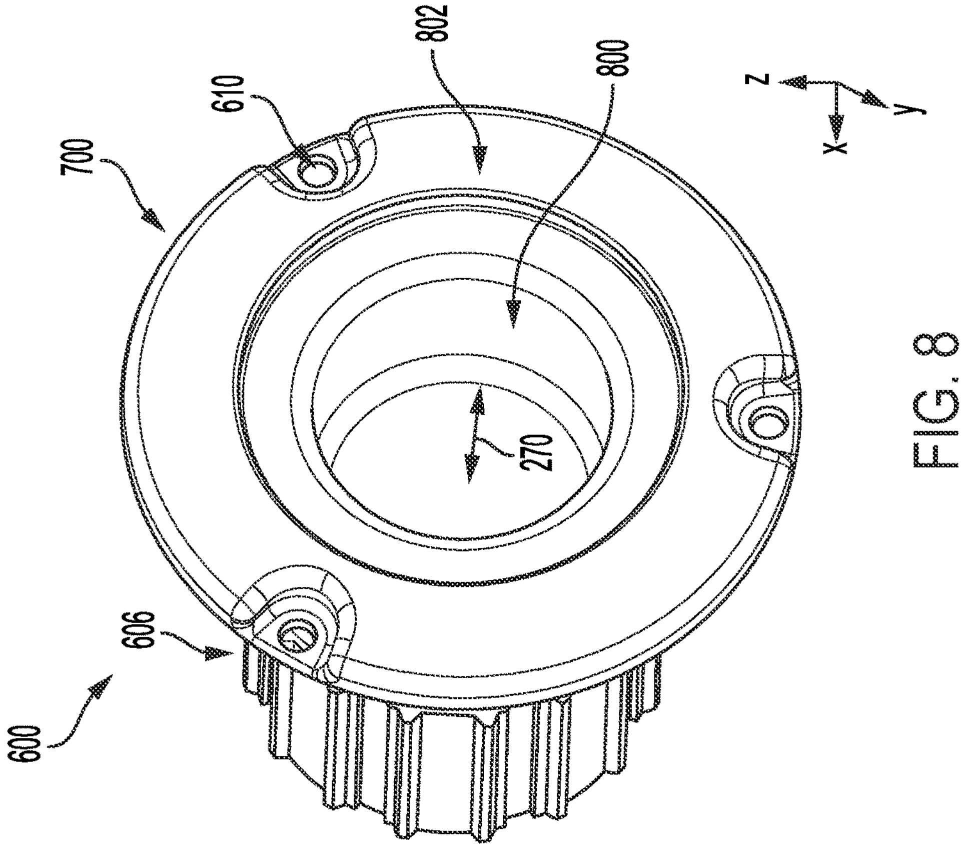
FIGS. 7 and 8 are detailed illustrations of the torque coupling, depicted in FIG. 5.
Figure 7:
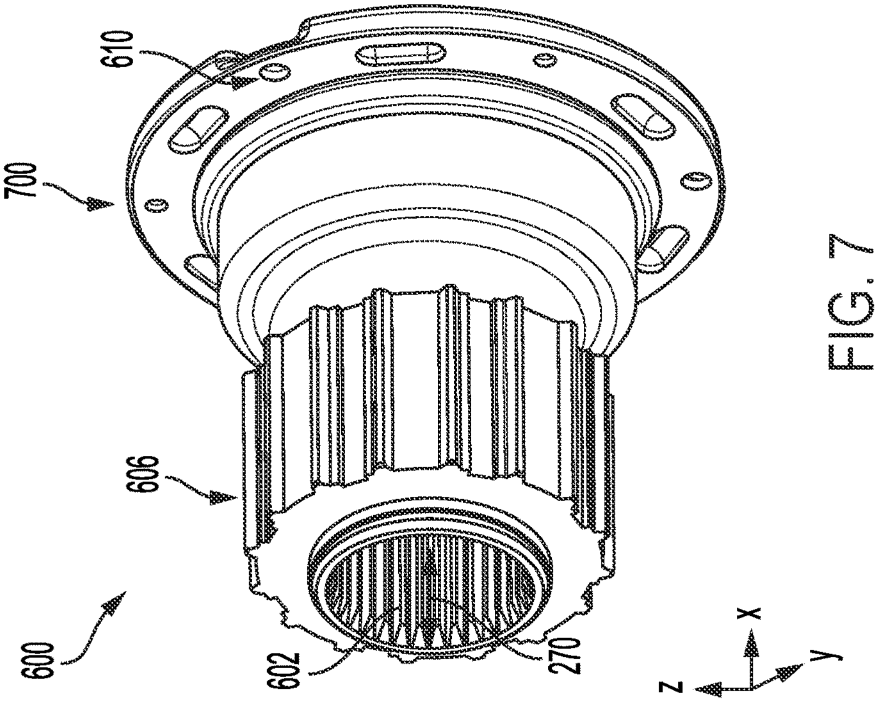
Figure 9:
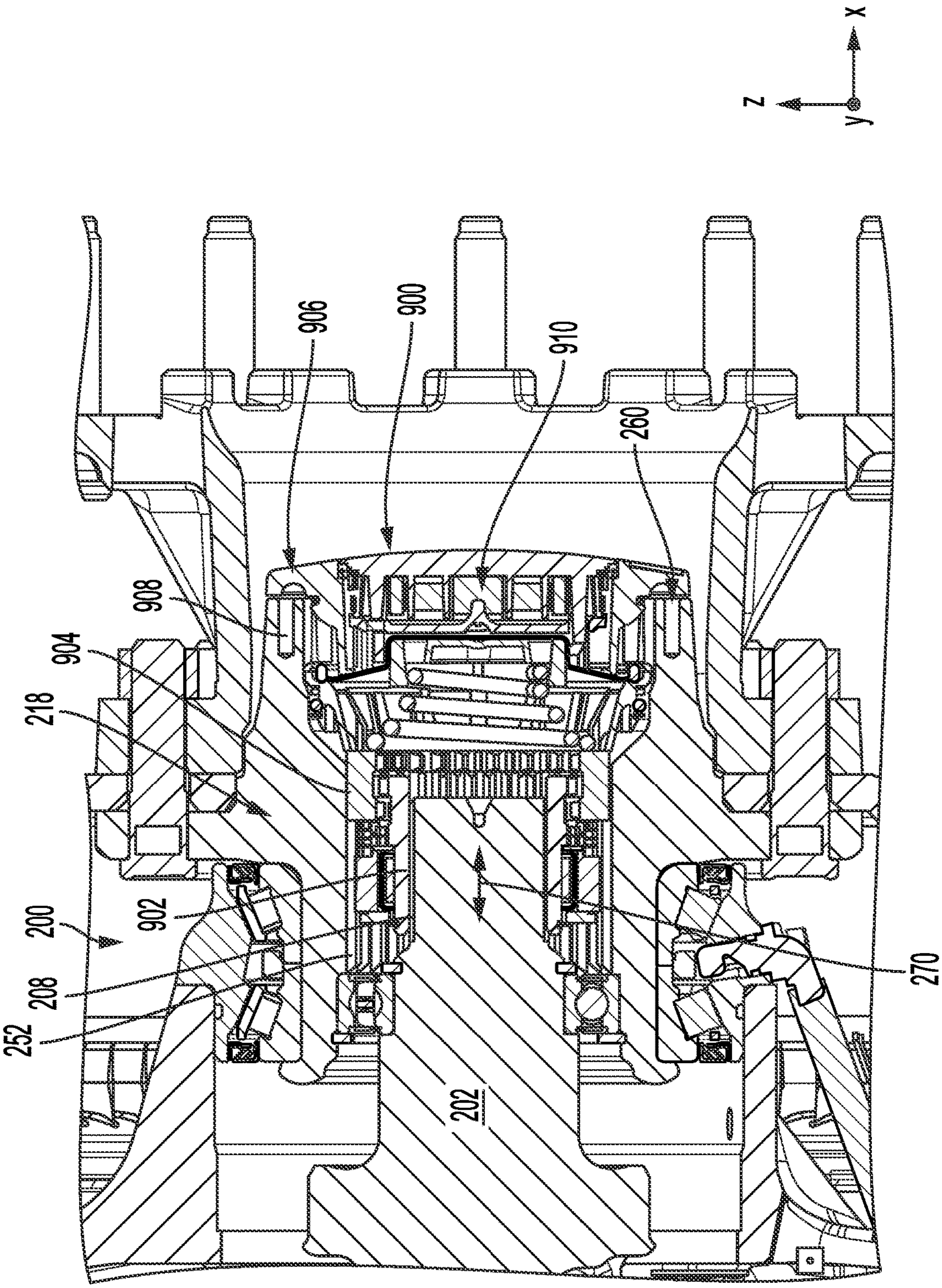
FIG. 9 is a detailed cross-sectional illustration of the wheel hub system, depicted in FIG. 2, with a hub lock device attached to the system.

The wheel hub systems 158 and 160 include attachment interfaces that are configured to attach to torque couplings 163 as well as hub lock devices 165. Arrows 166 indicate the different mechanical connections that may be formed between the wheel hub systems 158 and 160 and the torque couplings 163 or the hub lock devices 165. The torque couplings 163 are each configured to continuously transfer mechanical power between the corresponding shaft and drive wheel, during axle operation. Axle operation includes an operating condition where power is transferred to the axle shafts from the upstream powertrain components such as the transmission and the prime mover. Axle operation also includes an operating condition where torque is transferred to the drive wheel from the road such as during towing operation, for instance. The hub lock devices 165 are configured to selectively transfer mechanical power from the shafts 154 and 156 to the drive wheels 126 and 128, respectively. To elaborate, when the hub lock devices 165 are locked the devices continuously transfer mechanical power between the respective shaft and drive wheel. Conversely, when the hub lock devices 165 are unlocked, mechanical power transfer through the hub lock devices 165 is inhibited. the hub lock devices 165 may be actuated via electro-mechanical, hydraulic, or pneumatic actuators 168 (either via operator input or automatically via a controller which is elaborated upon herein). In other examples, the hub lock devices 165 may be manually actuated via manual mechanical actuators 170. Thus, both manually actuated hub lockers and remotely actuated hub lockers may be removably coupled to the wheel hub systems 158 and 160. A detailed example of a wheel hub system is shown in FIGS. 2, 4, and 5, a detailed example of a torque coupling is shown in FIGS. 6-8, and a detailed example of a hub lock device is shown in FIG. 9, all of which are discussed in greater detail herein.

The vehicle 100 shown in FIG. 1 may further include a control system 190 with a controller 191, as shown in FIG. 1. The controller 191 may include a microcomputer with components such as a processor 192 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by the processor for performing the methods and control techniques described herein as well as other variants that are anticipated but not specifically listed. As such, the control techniques, methods, and the like expanded upon herein may be stored as instructions in non-transitory memory.

The controller 191 may receive various signals from sensors 195 coupled to various regions of the vehicle 100. For example, the sensors 195 may include a pedal position sensor designed to detect a depression of an operator-actuated pedal such as an accelerator pedal and/or a brake pedal, speed sensor(s) at the transmission input and/or output shaft, gear selector sensor, clutch position sensors, and the like. An input device 198 (e.g., accelerator pedal, brake pedal, drive mode selector, gear selector, combinations thereof, and the like) may further provide input signals indicative of an operator's intent for vehicle control.

Upon receiving the signals from the various sensors 195 of FIG. 1, the controller 191 processes the received signals, and employs various actuators 196 of system components to adjust the components based on the received signals and instructions stored on the memory of controller 191. For example, the controller 191 may be designed to engage and disengage the hub lock devices 165. For instance, the controller 191 may automatically determine that the hub lock devices 165 should be unlocked such that torque transfer from the stub shafts to the drive wheels is inhibited. Responsive to determining that the hub lock devices should be unlocked, the controller may send control commands to the actuators 168 in the hub lock devices 165 that trigger unlocking of the devices. The other controllable components in the system may function in a similar manner with regard to sensor signals, control commands, and actuator adjustment, for example. Alternatively, the hub lock devices 165 may be electronically disconnected in response to user interaction with the input device 198 or may be designed for manual release at the hub lock devices 165 via the manual mechanical actuators 170.

An axis system is provided in FIG. 1 as well as FIGS. 2-9, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 shows a detailed illustration of an example of wheel hub system 200. The wheel hub system 200 include a shaft 202 which is configured to rotationally coupled to upstream driveline components (e.g., a joint, a shaft, and the like). To elaborate, the shaft 202 is a stub shaft in the illustrated example. The stub shaft 202 at its inboard side 204 includes a mechanical interface 206 which is a yoke that is configured to couple to a joint (e.g., a constant velocity (CV) joint) in the illustrated example However, other suitable attachment interfaces may be formed in the inboard side of the stub shaft 202 such as male spline. The stub shaft 202 further includes exterior splines 208 (e.g. male splines) on an outboard side 210 of the shaft. These exterior splines 208 on the shaft 202 are profiled to mate with female splines in torque couplings and hub lock devices discussed in greater detail herein with regard to FIGS. 6-9. As described herein splines include ridges and grooves that axially extend down a component.

An inner bearing 212 is further included in the wheel hub system 200. Specifically, an inner race 214 of the bearing is coupled to the shaft 202 at a location inboard of the exterior splines 208. The inner bearing 212 is a ball bearing in the illustrated example which allows the bearing to manage radial loads. Further, an outer race 216 of the inner bearing 212 is coupled to a hub body 218. An outer bearing assembly 220 is coupled to an outer circumference 222 of the hub body 218. The outer bearing assembly 220 is a thrust bearing assembly designed to manage axial and radial loads in the illustrated example. Thus, the thrust bearing assembly includes tapered rollers 224, an inner race 226 in face sharing contact with the hub body 218, and an outer race 228. The outer race 228 may be coupled to a steering knuckle 230 in a steering system or other suitable axle component. In the illustrated example, the outer bearing assembly 220 is positioned within a recess 232 in the hub body 218 to increase the system's space efficiency, although other hub body contours have been contemplated.

A snap ring 234 is coupled to an interior 235 of the hub body 218. Further, a circlip 236 is coupled to an outer surface 238 of the shaft 202. To expound, the circlip 236 is positioned on an outboard side 240 of the inner bearing 212 and the snap ring 234 is positioned on an inboard side 242 of the inner bearing 212. In this way, the circlip 236 and the snap ring 234 axially delimit the inner bearing 212, allowing the bearing to be retained in a desired axial position.

In the illustrated example, the hub body 218 further includes a flange 244 that is removably attached to a wheel flange 246 via fasteners 248 or other suitable attachment devices. The wheel flange 246 is profiled to attach to a drive wheel via fasteners 250.

The hub body 218 further includes interior splines 252 (e.g., female splines) that circumferentially surround the exterior splines 208 on the shaft 202. Therefore, a diameter 254 of the interior splines 252 is greater than a diameter 256 of the exterior splines 208. A gap 258 is formed between the interior splines 252 and the exterior splines 208. This gap allows for the torque couplings and the hub lock devices (which are expanded upon herein) to be effectively attached to the wheel hub system 200.

The hub body 218 further includes a fastener joint 260 at an outboard side 262. The fastener joint 260 is profiled to receive fasteners which allow the torque couplings and the hub lock devices to be removably attached to the wheel hub system 200. A rotational axis 270 of the wheel hub system 200 is provided in FIG. 2 as well as FIGS. 2-9 for reference.

Figure 3:
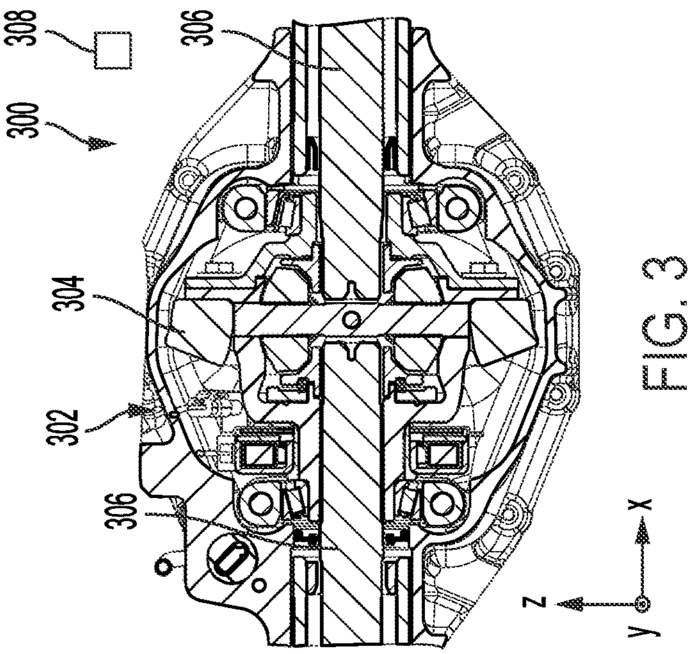
FIG. 3 is a cross-sectional illustration of an exemplary drive axle.

It will be understood that the wheel hub system 200 may be incorporated into an axle assembly. FIG. 3 shows an axle assembly 300 with a differential 302 that connects to upstream driveline components via an input gear 304 (e.g., ring gear) and to axle shafts 306. It will be appreciated that the axle shafts 306 may be coupled to joints (e.g., CV joints) which are in turn coupled to the stub shaft 202 in the wheel hub system 200, shown in FIG. 2. Thus, the axle assembly 300 may be a steering axle, in one example. To elaborate, the axle assembly 300 may be a solid beam steering axle. A solid beam steering axle is an axle with mechanical components structurally supporting one another and extending between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, the camber angle of the wheels may remain substantially constant as the suspension moves through its travel. The solid beam steering axle may be coupled to a dependent suspension system 308, in one example. Therefore, the solid beam axle may be an unsprung mass. Alternatively, the axle shafts 306 may be the shaft which is included in the wheel hub system and splined at an outboard end in the case of a non-steering axle.

FIG. 4 shows a detailed illustration of the shaft 202 (e.g., stub shaft) with the exterior splines 208 at the outboard side 210 and the mechanical interface 206 at the other opposing side which is in the form of a yoke, in the illustrated example The inner bearing 212 is shown coupled to the shaft 202 with the circlip 236 which is removably coupled to the shaft 202 and allows the inner bearing to be retained in a desired axial position. The diameter 400 of the exterior splines 208 is less than the diameter of the section of the shaft which the inner bearing is attached to allow the snap ring to be efficiently installed and removed from the shaft.

FIG. 5 shows a detailed view of the hub body 218. The interior splines 252 are again depicted along with the flange 244 that allows the wheel flange 246, shown in FIG. 2, to be removably attached thereto. The hub body 218 may include a tapered surface 500 at the outboard side 502 of the interior splines 252. The tapered surface 500 allows the torque couplings and the hub lock devices to be more easily aligned and mated with the female splines in the hub body 218.

Openings 504 in the flange 244 are specifically depicted which may receive fasteners or other suitable attachment devices.

FIG. 6 shows a cross-sectional view of the wheel hub system 200 with a torque coupling 600 removably attached thereto. To elaborate, female splines 602 on an interior opening 604 of the torque coupling 600 mate with the exterior splines 208 on the shaft 202 and male splines 606 on an exterior of the torque coupling 600 mate with the interior splines 252 in the hub body 218. These splined interfaces allow the torque coupling to be efficiently installed and removed from the hub system.

Additionally, fasteners 608 extend through openings 610 in the torque coupling 600 and extend into the fastener joint 260 in the hub body 218 to allow the torque coupling 600 to be removably secured to the wheel hub system 200. The torque coupling 600 is therefore positioned in an interior opening 612 of the hub body 218 as well as in an opening 614 of the wheel flange 246.

FIG. 7 shows a detailed view of the torque coupling 600. The female splines 602 and the male splines 606 in the torque coupling 600 are again depicted in FIG. 7. The female splines 602 have a greater pitch than the male splines 606. However, other torque coupling configurations have been contemplated. A flange 700 which interfaces with the fastener joint 260, shown in FIG. 6, is further depicted in FIG. 7. In particular, the openings 610 in the flange 700 are illustrated in FIG. 7.

FIG. 8 shows another view of the torque coupling 600. A recess 800 may be included in the outboard side 802 of the torque coupling 600. The flange 700 with the openings 610 and the male splines 606 are again depicted.

FIG. 9 shows a hub lock device 900 removably coupled to the wheel hub system 200. As shown, female splines 902 in the hub lock device 900 are mated with the exterior splines 208 on the shaft 202 and male splines 904 in the hub lock device 900 are mated with the interior splines 252 in the hub body 218. Further, a flange 906 in the hub lock device 900 is coupled to the fastener joint 260 via fasteners 908. In this way, the wheel hub system 200 is able to be quickly adapted for both the hub lock device 900 shown in FIG. 9 and the torque coupling 600, depicted in FIGS. 6-8. Consequently, the wheel hub system is able to be reconfigured for a wide range of vehicle platforms, thereby increasing customer appeal. Further, it will be understood, that due to this adaptability, end-users are able to modify the wheel end assembly according to their predilection.

The hub lock device 900 includes a manual actuator 910 in the illustrated example. The manual actuator 910 allows a vehicle operator to manually lock and unlock the wheel hub system. For instance, the hub lock device may be unlocked for towing or when all wheel drive operation is not desired. Alternatively, the hub lock device may be configured to be hydraulically or pneumatically actuated, for instance.

FIGS. 2-9 are drawn approximately to scale, aside from the schematically depicted components, although other relative component dimensions may be used, in other embodiments. FIGS. 1-9 show example configurations with relative positioning of the various components. If shown directly contacting each other, or directly coupled, then such elements may be referred to as directly contacting or directly coupled, respectively, at least in one example Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention is further described in the following paragraphs. In one aspect, a wheel hub system is provided that comprises an outer bearing assembly with an inner race coupled to a hub body; a wheel flange configured to removably coupled to the hub body; an inner bearing including an outer race that is coupled to the hub body and an inner race that is coupled to a shaft; wherein the hub body includes interior splines which circumferentially surround exterior splines on the shaft. In one example, the interior splines may be configured to removably couple to: in a first configuration, a hub lock device configured to inhibits mechanical power transfer therethrough when unlocked; and in a second configuration, a torque coupling that during axle operation continuously transfers mechanical power between the shaft and a wheel. Further, in one example, the exterior splines on the shaft may be configured to mate with interior splines in both the hub lock device and the torque coupling in the first configuration and the second configuration, respectively. In one example, the hub body may include a fastener joint that is configured to receive multiple fasteners that extend through the hub lock device in the first configuration, and through the torque coupling in the second configuration. Still further, in one example, the hub lock device may be configured for manual engagement and disengagement. In one example, the hub lock device may be configured for electronic engagement and disengagement. In one example, the wheel hub system may further comprise a circlip removably coupled to the shaft adjacent to an outboard side of the inner bearing. In one example, the wheel hub system may further comprise a snap ring removably coupled to the hub body adjacent to an inboard side of the inner bearing, wherein the circlip and the snap ring axially delimit the inner bearing. In one example, the shaft may be a stub shaft in a steering axle. Still further in one example, the steering axle may be a rigid beam steering axle. In one example, the shaft may be coupled to an electric powertrain. In one example, the inner bearing may be a ball bearing.

In another aspect, a wheel hub system is provided that comprises an outer bearing assembly with an inner race coupled to a hub body; a wheel flange configured to removably coupled to the hub body; an inner bearing including an outer race that is coupled to the hub body and an inner race that is coupled to a shaft which includes male splines; wherein the hub body includes female splines; wherein the female splines have a larger diameter than the male splines; wherein the female splines and the male splines are configured to attach to a hub lock device and a torque coupling in different configurations. Further in one example, the hub body may include a fastener joint that is configured to receive multiple fasteners that extend through the hub lock device in the first configuration, and through the torque coupling in the second configuration. In one example, an inner diameter of the fastener joint may be larger than the diameter of the female splines. In one example, the wheel hub system may further comprise a circlip and a snap ring each which are positioned at opposing sides of the inner bearing and axially capture the inner bearing. In one example, the inner bearing may be a ball bearing and wherein the outer bearing assembly is a thrust bearing assembly. Still further in one example, the shaft may be a stub shaft configured to attach to an axle joint. In one example, the axle joint may be rotationally coupled to an electric powertrain. In one example, the wheel hub system may further comprise a steering knuckle attached to the outer bearing assembly.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A wheel hub system, comprising:

an outer bearing assembly with an inner race coupled to a hub body;

a wheel flange configured to removably coupled to the hub body;

an inner bearing including an outer race that is coupled to the hub body and an inner race that is coupled to a shaft; and a circlip removably coupled to the shaft adjacent to an outboard side of the inner bearing;

wherein the hub body includes interior splines which circumferentially surround exterior splines on the shaft.

2. The wheel hub system of claim 1, wherein the interior splines are configured to removably couple to:

in a first configuration, a hub lock device configured to inhibit mechanical power transfer therethrough when unlocked; and in a second configuration, a torque coupling that during axle operation continuously transfers mechanical power between the shaft and a wheel.

3. The wheel hub system of claim 2, wherein the exterior splines on the shaft are configured to mate with interior splines in both the hub lock device and the torque coupling in the first configuration and the second configuration, respectively.

4. The wheel hub system of claim 2, wherein the hub body includes a fastener joint that is configured to receive multiple fasteners that extend through the hub lock device in the first configuration, and through the torque coupling in the second configuration.

5. The wheel hub system of claim 2, wherein the hub lock device is configured for manual engagement and disengagement.

6. The wheel hub system of claim 2, wherein the hub lock device is configured for electronic engagement and disengagement.

7. The wheel hub system of claim 1, further comprising a snap ring removably coupled to the hub body adjacent to an inboard side of the inner bearing, wherein the circlip and the snap ring axially delimit the inner bearing.

8. The wheel hub system of claim 1, wherein the shaft is a stub shaft in a steering axle.

9. The wheel hub system of claim 1, wherein the inner bearing is a ball bearing.

10. A wheel hub system, comprising:

an outer bearing assembly with an inner race coupled to a hub body;

a wheel flange configured to removably coupled to the hub body;

an inner bearing including an outer race that is coupled to the hub body and an inner race that is coupled to a shaft which includes male splines; and a circlip and a snap ring positioned on opposing sides of the inner bearing and axially capturing the inner bearing;

wherein the hub body includes female splines;

wherein the female splines have a larger diameter than the male splines; and wherein the female splines and the male splines are configured to attach to a hub lock device and a torque coupling in different configurations.

11. The wheel hub system of claim 10, wherein the hub body includes a fastener joint that is configured to receive multiple fasteners that extend through the hub lock device in a first configuration, and through the torque coupling in a second configuration.

12. The wheel hub system of claim 11, wherein an inner diameter of the fastener joint is larger than the diameter of the female splines.

13. The wheel hub system of claim 10, wherein the inner bearing is a ball bearing and wherein the outer bearing assembly is a thrust bearing assembly.

14. The wheel hub system of claim 10, wherein the shaft is a stub shaft configured to attach to an axle joint.

15. The wheel hub system of claim 10, further comprising a steering knuckle attached to the outer bearing assembly.

* * * * *